United States Patent Office 3,245,247
Patented Apr. 12, 1966

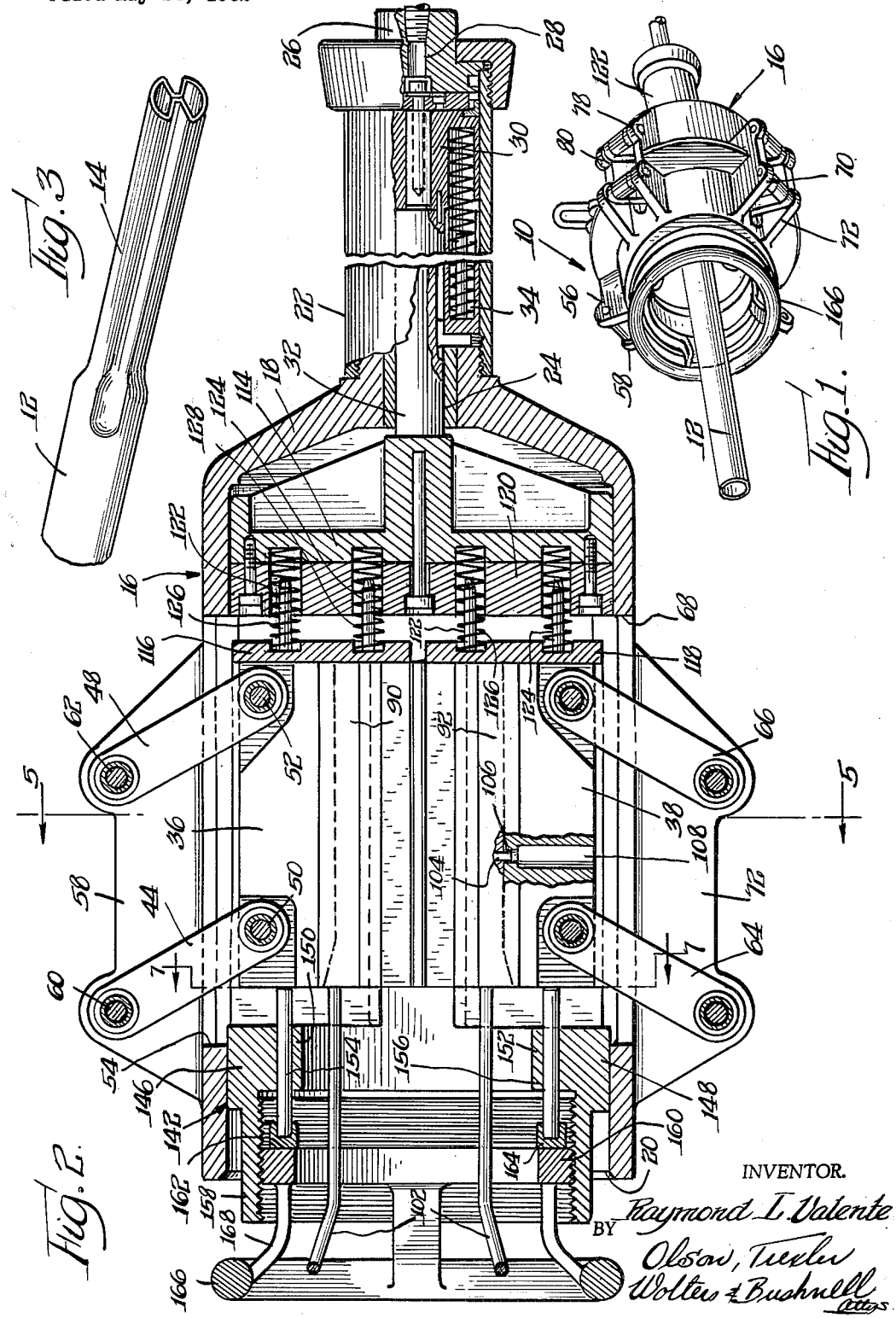

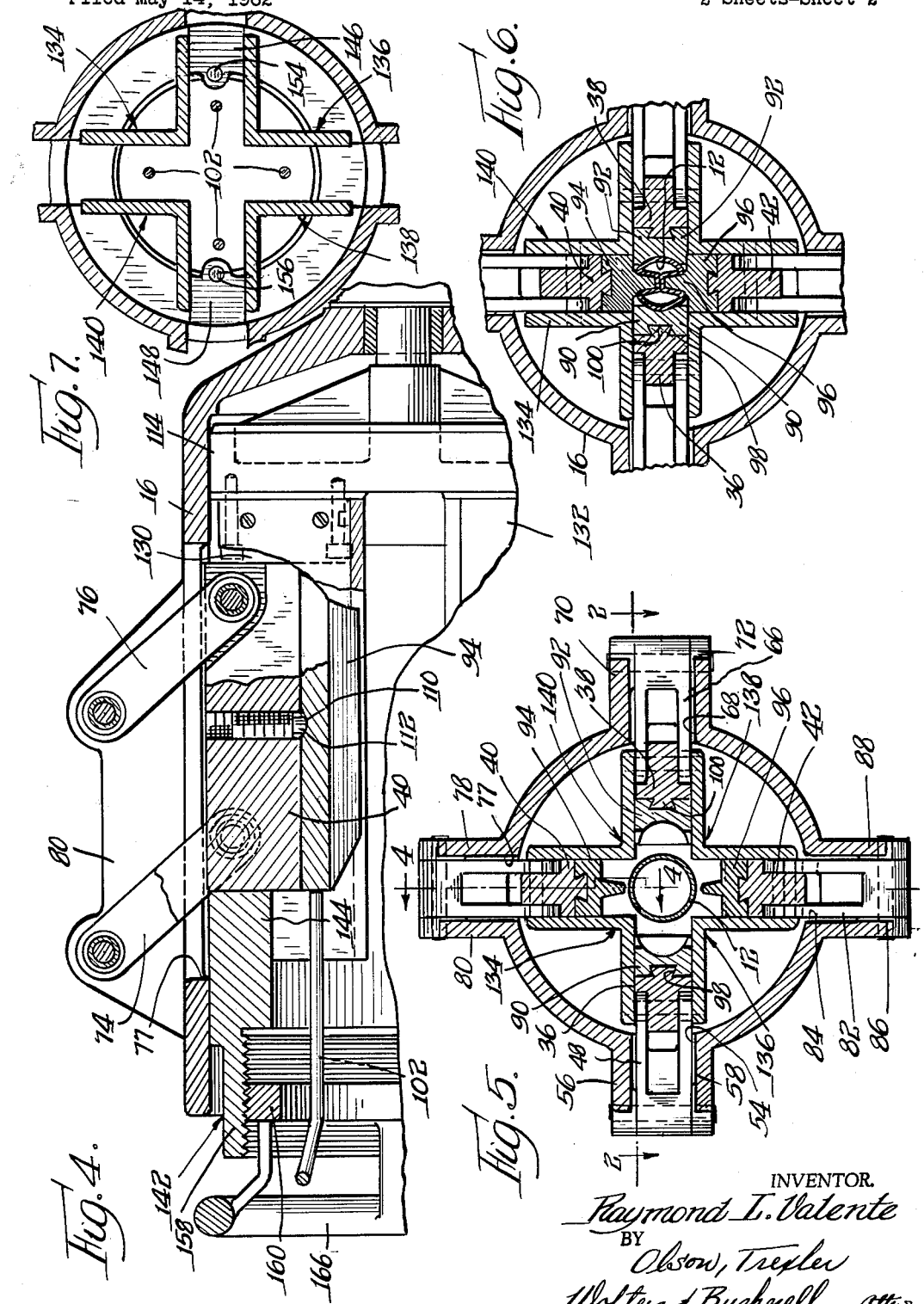

3,245,247
APPARATUS FOR POINTING WORKPIECES
Raymond L. Valente, Oak Lawn, Ill., assignor to Manco Manufacturing Company, Bradley, Ill., a corporation of Illinois
Filed May 14, 1962, Ser. No. 194,302
8 Claims. (Cl. 72—402)

The present invention relates to a novel apparatus for forming a portion of a workpiece so as to reduce transverse dimensions thereof, and more specifically to a novel apparatus for reducing the diameter of or pointing an end portion of a tubular workpiece.

It is frequently desired to reduce the diameter of a length of pipe or tubing by drawing the tubing through a reducing die. In order to permit starting of the tubing through the reducing die, it is necessary to compress or point an end portion of the tubing. The present invention contemplates a novel apparatus which is especially suitable for pointing end portions of such tubes. However, it will be apparent that apparatus incorporating features of the present invention may also be used for processing various other workpieces.

An important object of the present invention is to provide a novel apparatus capable of pinching or compressing a workpiece, which apparatus is of compact construction and may be readily mounted or positioned at any desired location.

A further object of the present invention is to provide a novel apparatus for pinching or compressing a workpiece, which apparatus is of relatively rugged construction and is adapted to apply forming forces generally uniformly along a length of a workpiece being processed.

A further object of the present invention is to provide a novel apparatus of the above described type which is constructed so as to assure proper positioning of a workpiece within the apparatus prior to the starting of a workpiece forming or pinching operation.

A more specific object of the present invention is to provide a novel apparatus of the type set forth in the preceding paragraph, which apparatus is adjustable for guiding and centering workpieces or tubing of different diameters.

Another specific object of the present invention is to provide a novel apparatus of the above described type which is constructed for facilitating quick replacement of workpiece engaging elements or dies thereof.

Other objects and advantages of the present invention will become apparent in the following description and the accompanying drawing, wherein:

FIG. 1 is a perspective view showing an apparatus incorporating features of the present invention;

FIG. 2 is an enlarged partial sectional view taken generally along line 2—2 in FIG. 5;

FIG. 3 is a fragmentary perspective view showing a length of tubing with an end portion thereof reduced in diameter or pointed in accordance with the present invention;

FIG. 4 is a fragmentary sectional view taken along line 4—4 in FIG. 5;

FIG. 5 is a sectional view taken along line 5—5 in FIG. 2;

FIG. 6 is a fragmentary view similar to FIG. 5 but shows die elements of the apparatus in a collapsed workpiece pinching condition; and FIG. 7 is a fragmentary sectional view taken along line 7—7 in FIG. 2.

Referring now more specifically to the drawings wherein like parts are designated by the same numerals throughout the various figures, an apparatus 10 is shown which is capable of processing a workpiece or length of tubing 12. More specifically the apparatus is adapted to pinch and compress an end portion 14 of the tubing so as to reduce the overall outside diameter thereof as shown best in FIG. 3.

The apparatus 10 comprises a cylindrical housing or shell 16 having an end wall 18 traversing one end thereof and an opposite open end 20. A fluid pressure or hydraulic cylinder 22 is suitably connected to or formed integrally with the end wall 18, which end wall has a central aperture 24 therethrough aligned with the cylinder. Suitable end fitting means 26 is provided for closing the free or outer end of the cylinder 22, and a fluid passageway 28 is provided through the end fitting means for permitting the entry of fluid under pressure into the cylinder. As will be understood, the end fitting means is adapted to be connected with a source of fluid under pressure by a conduit, not shown.

A piston 30 is slidably disposed within the cylinder 22 for actuating a ram 32 connected therewith and extending through the aperture 24 and into the main cylindrical housing 16. Spring means 34 is provided between the piston 30 and an end of the hydraulic cylinder 22 for returning the piston to its retracted position when fluid pressure in the cylinder relieved. The apparatus is provided with pairs of opposed tool or die carriers 36–38 and 40–42 which are arranged as shown best in FIGS. 5 and 6 and are mounted for movement between outer or retracted positions shown in FIG. 5 and extended workpiece forming positions shown in FIG. 6. It is to be noted that the die carrier 36 is supported by a pair of links 44 and 48 respectively pivotally connected to opposite end portions of the carrier by pins 50 and 52. The links project outwardly through an elongated slot 54 formed in the cylindrical housing 16. Outer ends of the links 44 and 48 are respectively pivotally connected between upstanding flanges 56 and 58 on the housing by pins 60 and 62. The arrangement is such that when the carrier 36 is moved from its outer or retracted position towards its inner or workpiece forming position in the manner described herein below, the carrier will continuously be maintained parallel to the longitudinal axis of the housing 16. The remaining die carriers are supported in the same manner as the carrier 36. Thus the carrier 38 is pivotally connected with links 64 and 66 which extend through a slot 68 in the housing and are pivotally connected with flanges or ears 70 and 72 formed integrally with the housing 16. Additional links 74 and 76 are pivotally connected to the carrier 40 and extend through a slot 77 in the housing 16. These links are in turn pivotally connected between ears or flanges 78 and 80 integral with the housing 16 and located midway between the pairs of flanges 56–58 and 70–72. Identical links 82 (only one of which is shown in FIG. 5) are pivotally connected with opposite end portions of the carrier 42. These links extend through a slot 84 in the housing for pivotal connection with flanges 86 and 88 which are oppositely disposed from the flanges 78 and 80.

In accordance with features of the present invention the apparatus is provided with pairs of dies 90–92 and 94–96 which are connected with the carrier members so that they may be quickly and easily removed and replaced. More specifically, each of the die members is provided with a longitudinally extending dovetail slot 98 adapted to receive a complementary element 100 of its associated carrier member. Each die member has an elongated handle 102 welded or otherwise fixed to an end thereof and extending outwardly of the end of the housing 16, which handle facilitates sliding the die member into association with or pulling the die member from its associated carrier.

As shown in FIG. 2 each of the die members 90 and 92 is provided with a recess in which a spring biased detent or pin 104 is mounted. The pin 104 is adapted to project into an aperture 106 in the associated carrier member for releasably locking the die with respect to the carrier member. An enlarged aperture 108 extends entirely through the carrier member for enabling a tool to be used for pushing the pin inwardly for enabling the die to be released from the carrier member. If desired a spring biased pin or detent 110 may be mounted in a suitable aperture in the carrier member for engaging in a notch 112 formed in the die member as shown in FIG. 4. In any event it is contemplated that a releasable spring biased detent be provided in association with each die and its carrier. The engagement of the pin 110 in the notch 112 will retain the die member against axial movement until a sufficient force is manually applied by pulling on the handle member 102 to cause the pin 110 to be cammed outwardly against the action of its associated spring whereupon the pin 110 will become disengaged from the notch and the die member may be freely withdrawn from the holder or carrier.

As shown in FIGS. 2 and 4, the links which support the die carriers are respectively inclined rearwardly from a plane perpendicular to the longitudinal axis of the housing 16 when the carriers are in their retracted or outer positions. In order to accomplish a workpiece forming or crimping operation, the die carrier members are pushed forwardly or toward the left as viewed in FIGS. 2 and 4. As the die carriers are advanced, the link members rotate about their respective outer pivot pins toward positions extending generally perpendicular to the longitudinal axis of the apparatus. As a result, the link members force the die carriers radially inwardly toward the position shown in FIG. 6 for accomplishing the workpiece forming or pinching operation.

The apparatus is provided with means connected with ram 32 for actuating the die carrier members. This means comprises a head member 114 fixed to the ram 32 and slidably disposed within the cylindrical housing 16. Resiliently supported pressure pads 116 and 118 are carried by the head member 114 for engaging inner ends of the carrier members 36 and 38 and the dies carried thereby. As shown in FIG. 2, the resiliently supported pressure pads 116 and 118 are normally spaced from block elements or shims 120 mounted on the head member 114 and are supported by pairs of pins 122 and 124 slidably extending into apertures formed in the block 120 and head member. Compresion springs 126 and 128 are disposed around the pins 122 and 124 for normally biasing the pads toward their extended positions.

Additional blocks or shims 130 and 132 are fixed on the head member 114 for engaging inner ends of the carrier members 40 and 42 and the dies carried thereby as shown in FIG. 4. Guide and connecting members 134, 136, 138, and 140 which may be in the form of angle irons as shown best in FIGS. 5–7 have inner ends thereof connected with the blocks 120, 130 and 132 and therefore with the actuating head 114. This connection may be made by any suitable means such as by welding or with the aid of screws or similar fasteners. Outer ends of the guide and connecting members are similarly secured to a ring member 142 which is slidably disposed within the cylindrical housing 16 at a location outwardly of the outer ends of the die carriers. Thus the guide and connecting members 134 through 140 serve to connect the ring 142 for movement in unison with the actuating head 114. As shown best in FIGS. 5 and 6 these guide and connecting members also present pairs of opposed flanges which serve slidably to confine and guide opposite sides of the die carriers and the dies associated therewith.

The ring member 142 is substantially symmetrically formed so that it is provided with a pair of rigid abutment portions 144 (only one of which is shown in FIG. 4) respectively engageable with outer ends of the die carriers 40 and 42. Portions 146 and 148 of the ring member between the portions 144 are axially recessed so as to avoid direct engagement with outer ends of the die carriers 36 and 38 as shown in FIG. 2. However these portions of the ring member are provided with radially inwardly projecting bosses 150 and 152 having axially extending apertures therethrough slidably receiving adjustable stop pins 154 and 156. These adjustable stop pins are engageable with outer ends of the die carriers 36 and 38 for positioning the carriers in the manner for the purpose described below.

The ring member 142 is provided with an axially extending internally threaded sleeve portion 158 into which the stop pins 154 and 156 project. An externally threaded annular nut element 160 is turned into the sleeve portion 158 and provides an adjustable abutment for engaging and locating the stop pins 154 and 156. Preferably hardened wear buttons 162 and 164 are provided between the pins and the nut element 160. An annular handle member 166 is connected with the nut element 160 by spokes 168 for facilitating manual turning and adjustment of the nut element.

With the structure described above, it will be noted that the opposite ends of the die carriers 40 and 42 are closely but slidably confined by and between the rigidly supported blocks or shims 130 and 132 on the actuating head 114 and the fixed abutment portions 144 on the ring member 142. Thus the carrier members 40 and 42 and the dies supported thereby will be positively moved axially of the housing 16 in opposite directions a distance corresponding to the full stroke of the ram 32. Thus during each forward and reverse movement of the ram, the carrier members 40 and 42 will be moved to and from the full radially extended or workpiece forming positions shown in FIG. 6 and the full radially retracted position shown in FIGS. 4 and 5.

With the structure described above, the die carriers 36 and 38, as distinguished from the carriers 40 and 42 do not necessarily return to full radially retracted positions after a workpiece forming or pinching operation. More specifically, the retracted position of the die carriers 36 and 38 may be adjusted so that the dies 90 and 92 carried thereby provide guide surfaces, when in their retracted position, spaced apart only slightly greater than the maximum diameter of the workpiece or tube 12. This enables the workpiece or tubing 12 to be inserted between the dies and at the same time the dies 90 and 92 serve to guide the workpiece and center the workpiece within the apparatus prior to the forming operation.

The die carriers 36 and 38 are positioned for accomplishing the above discussed guiding and centering function by adjusting the position of the stop pins 154 and 156. More specifically it is to be noted that these pins are positioned so that the end surfaces thereof which engage the die carriers are located in a plane offset axially outwardly from the carrier engageable end surfaces of the abutment portions 144 of the ring member. Furthermore the spring biased pressure pads 116 and 118 urged the carrier members 36 and 38 against the stop pins 154 and 156 so that when the actuating ram is fully retracted the carrier members 36 and 38 will be axially offset forwardly and also radially offset inwardly from the carrier members 40 and 42. Furthermore the links supporting the carrier members 36 and 38 will be inclined rearwardly from a plane perpendicular to the longitudinal axis of the apparatus at an angle substantially less than the angle of inclination of the links supporting the carriers 40 and 42 the spring biased pressure pads 116 and 118 also provide for lost motion between the carrier members 36 and 38 and the actuating head 114. More specifically, when the actuating head 114 starts to move toward the left as viewed in FIG. 2 during a workpiece forming or pinching operation, the carriers 36 and 38 may move slightly toward the left until the die elements carried thereby are firmly pressed against the workpiece or tubing. Further movement of the die elements is prevented by the tubing until the spring supporting the pads 116 and 118 have been compressed sufficiently to enable the block 120 carried by the actuating head to engage the pads directly. At this instant, the blocks 130 and 132 on the actuating head also engage the carrier members 40 and 42 so that further movement of the actuating head causes all of the carrier members and the dies associated therewith to be positively actuated in unison for accomplishing or forming pinching of the tubing.

While the preferred embodiment of the present invention has been shown and described herein it is obvious that many structural details may be changed without departing from the spirit and scope of appended claims.

The invention is claimed as follows:

1. An apparatus for forming a workpiece comprising elongated generally cylindrical housing means having an opening through one end thereof, fluid cylinder and piston means connected with an opposite end of said housing means and including a ram extending through said opposite end of the housing means, a first pair of die means generally diametrically oppositely disposed within said housing means, a second pair of die means generally diametrically oppositely disposed within said housing means and angularly offset from said first die means, a pair of substantially parallel links pivotally connected to spaced portions of each of said die means and projecting outwardly therefrom, said housing means including circumferentially spaced longitudinally extending slots through which said links extend, means pivotally connecting outer ends of said links with respect to said housing means for supporting said die means for movement between radially outwardly disposed and retracted positions and radially inwardly projected workpiece engaging and forming positions, a head structure slidably disposed within said housing means and connected with said ram and engageable with first ends of said die means for actuating the die means in one direction, and an annular structure slidably disposed within said housing means adjacent and engageable with opposite ends of said die means and connected with said head structure for moving said die means in an opposite direction.

2. An apparatus, as defined in claim 1, wherein said head structure and said annular structure include co-operable means for locating said second die means radially inwardly of said first pair of die means when said second pair of die means are in their retracted position.

3. An apparatus, as defined in claim 1, wherein each of said die means comprises a carrier member pivotally connected directly to the links associated therewith, and a die member releasably connected to said carrier member.

4. An apparatus, as defined in claim 3, wherein said carrier member and said die member include complementary interengageable slot and flange means extending generally longitudinally of a central axis of said opening and retaining said members in similar relationship, resiliently biased detent means between said carrier and die members and releasably retaining said members against relative longitudinal movement, and a handle element connected with said die member and projecting substantially to said opening for facilitating assembly and disassembly of the die member with respect to said carrier member.

5. An apparatus for forming workpieces comprising housing means having an opening through one end thereof for permitting insertion of a workpiece to be formed, a first pair of generally diametrically oppositely disposed die means mounted within said housing means for movement between a retracted position and a workpiece engaging and forming position, a second pair of die means generally diametrically oppositely disposed within said housing means and angularly offset from said first pair of die means and mounted for movement between a retracted position and a workpiece engaging and forming position, and means for actuating said die means between said positions and including an actuating head structure slidably disposed within said housing means adjacent first ends of said die means, an annular member slidably disposed within said housing means adjacent second ends of said die means and connected for movement in unison with said head structure, said head structure and said annular member presenting first portions closely confining the first and second ends of said first pair of die means for causing movement of said first pair of die means substantially in unison with the head structure and the annular member, stop elements on said annular member for engaging said second ends of said second pair of die means for locating said second pair of die means in a predetermined manner, and pressure applying elements resiliently and yieldably supported on said head structure and engaging said first ends of said second pair of die means for biasing said second pair of die means toward said stop elements.

6. An apparatus, as defined in claim 5, wherein said stop elements are adjustably mounted on said annular member, said apparatus including means carried by and adjustable relative to said annular member and engaging said stop elements for adjusting the stop elements.

7. An apparatus, as defined in claim 6, wherein said stop elements are substantially straight and are axially slidably mounted on said annular member, said annular member including an internally threaded portion surrounding outer ends of said stop elements, and said means for adjusting the stop elements comprising an annular externally threaded member turned into said internally threaded portion and engageable with said outer ends of the stop elements.

8. An apparatus for forming workpieces comprising housing means open at one end thereof for permitting insertion of a workpiece to be formed, a first pair of die means generally diametrically oppositely disposed in said housing means and mounted for movement between a retracted position and a workpiece engaging and forming position, a second pair of die means generally diametrically oppositely disposed within said housing means and angularly offset from said first pair of die means and mounted for movement between a retracted position and a workpiece engaging and forming position, and actuating means connected between said housing means and said die means for moving the die means substantially in unison between said positions and simultaneously into forming engagement with a workpiece, said actuating means including means locating said second pair of die means at a retracted position radially inwardly of the retracted position of said first pair of die means for enabling said second pair of die means to engage and substantially center a workpiece prior to a forming operation.

References Cited by the Examiner

UNITED STATES PATENTS

| 1,070,379 | 8/1913 | Summey | 153—70 |
| 1,994,725 | 3/1935 | Offutt | 153—48 |
| 2,346,213 | 4/1944 | Flowers | 153—48 |

FOREIGN PATENTS

| 209,099 | 7/1924 | Great Britain. |

CHARLES W. LANHAM, *Primary Examiner.*